(12) United States Patent
LiU et al.

(10) Patent No.: US 11,486,692 B2
(45) Date of Patent: Nov. 1, 2022

(54) SIGNAL SOURCE SPACE SENSING METHOD AND APPARATUS, AND ACTIVE SENSING SYSTEM

(71) Applicant: SICHUAN UNIVERSITY, Chengdu (CN)

(72) Inventors: Kai LiU, Chengdu (CN); Ziyang Hu, Chengdu (CN); Xiaomin Yang, Chengdu (CN); Bin Xu, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 17/253,370

(22) PCT Filed: Apr. 19, 2019

(86) PCT No.: PCT/CN2019/083374
§ 371 (c)(1),
(2) Date: Dec. 17, 2020

(87) PCT Pub. No.: WO2019/242394
PCT Pub. Date: Dec. 26, 2019

(65) Prior Publication Data
US 2021/0254961 A1  Aug. 19, 2021

(30) Foreign Application Priority Data
Jun. 19, 2018 (CN) .......................... 201810629449.2

(51) Int. Cl.
*G01B 11/00* (2006.01)
*G01B 11/25* (2006.01)
(Continued)

(52) U.S. Cl.
CPC ........ *G01B 11/002* (2013.01); *G01B 11/2513* (2013.01); *G01B 11/2527* (2013.01);
(Continued)

(58) Field of Classification Search
CPC ..... G01B 11/002; G01B 11/026; G01B 11/22; G01B 11/24; G01B 11/25; G01B 11/2504;
(Continued)

(56) References Cited

U.S. PATENT DOCUMENTS

| 7,146,036 B2 * | 12/2006 | An Chang ........... G06K 9/2036 |
| | | 382/154 |
| 9,554,104 B2 * | 1/2017 | Fuchikami ............ G03B 21/14 |
| 9,816,287 B2 * | 11/2017 | Zhou .................. G01B 11/2545 |
| 10,089,778 B2 * | 10/2018 | Moule ...................... G06T 7/85 |

(Continued)

FOREIGN PATENT DOCUMENTS

| CN | 102364299 A | 2/2012 |
| CN | 103020954 A | 4/2013 |

(Continued)

*Primary Examiner* — Gordon J Stock, Jr.
(74) *Attorney, Agent, or Firm* — Perry + Currier Inc.

(57) ABSTRACT

Provided are a signal source space sensing method and apparatus, and an active sensing system. The method includes: a controller controls a signal transmitter to transmit a first signal to an object to be tested; the controller controls a signal receiver to receive a second signal, which is obtained after the first signal is transmitted by the object; the controller determines a coordinate relationship between the spatial position of said object and a signal source space according to the first signal and the second signal, wherein the signal source space is a coordinate space where the first signal transmitted by the signal transmitter is located; and the controller maps the second signal back to the signal source space according to the coordinate relationship between the spatial position of the object and the signal source space, to obtain a signal source space signal so as to reconstruct a sensing signal.

16 Claims, 9 Drawing Sheets

(51) Int. Cl.
*G01S 13/06* (2006.01)
*G01S 13/89* (2006.01)
*G01S 15/06* (2006.01)
*G01S 15/89* (2006.01)
*G01S 17/06* (2006.01)
*G01S 17/89* (2020.01)

(52) U.S. Cl.
CPC .............. *G01S 13/06* (2013.01); *G01S 13/89* (2013.01); *G01S 15/06* (2013.01); *G01S 15/89* (2013.01); *G01S 17/06* (2013.01); *G01S 17/89* (2013.01)

(58) Field of Classification Search
CPC ............ G01B 11/2509; G01B 11/2518; G01B 11/2522; G01B 11/2527; G01B 11/2531; G01B 11/2536; G01B 11/254; G01B 11/2545; G01S 13/06; G01S 13/89; G01S 15/06; G01S 15/89; G01S 17/06; G01S 17/89
See application file for complete search history.

(56) References Cited

U.S. PATENT DOCUMENTS

| | | | | |
|---|---|---|---|---|
| 10,240,915 | B2 * | 3/2019 | Fuchikami | G01B 11/2536 |
| 10,282,855 | B2 * | 5/2019 | Stigwall | G01B 11/2518 |
| 10,373,324 | B2 * | 8/2019 | Ohi | G01B 11/25 |
| 10,697,765 | B2 * | 6/2020 | Shimizu | G06F 17/12 |
| 10,803,622 | B2 * | 10/2020 | Wallack | G06T 7/80 |
| 2003/0133130 | A1 | 7/2003 | Takahashi | |
| 2004/0222987 | A1 * | 11/2004 | Chang | G06K 9/2036 |
| | | | | 345/419 |

FOREIGN PATENT DOCUMENTS

| | | | | |
|---|---|---|---|---|
| CN | 103366360 A | * | 10/2013 | G01B 11/25 |
| CN | 103727898 A | * | 4/2014 | |
| CN | 104200456 A | * | 12/2014 | |
| CN | 105526882 A | | 4/2016 | |
| CN | 105651203 A | * | 6/2016 | |
| CN | 105953747 A | | 9/2016 | |
| CN | 106524943 A | | 3/2017 | |
| CN | 108776338 A | | 11/2018 | |

* cited by examiner

SIGNAL SOURCE SPACE SENSING METHOD AND APPARATUS, AND ACTIVE SENSING SYSTEM

CROSS-REFERENCE TO RELATED APPLICATIONS

The present disclosure claims priority to Chinese Patent Application No. 2018106294492, filed with the Chinese Patent Office on Jun. 19, 2018, entitled "Signal Source Space Sensing Method and Apparatus, and Active Sensing System", which is incorporated herein by reference in its entirety.

TECHNICAL FIELD

Embodiments of the present disclosure relate to the technical field of active sensing, and in particular to a signal source space sensing method (i.e., a signal source space-based sensing method) and apparatus and to an active sensing system.

BACKGROUND ART

An active sensing system is a sensing system activated by probing the environment with self-generated energy of system, such as echolocation in bats and dolphins. Using self-generated energy allows better control of signal intensity, direction, timing, and spectral characteristics. A large number of artificial active sensing systems have been designed according to the basic principles and processes of active sensing, and widely used in the fields of navigation, national defense, meteorology, space exploration, industrial detection, biomedicine, and the like.

A traditional active sensing process involves using a transmitter (or an emitter) to emit a signal to a scene or object to be measured, and using a receiver to receive the returned signal containing information, including a signal reflected from or passing through the scene/object to be measured, followed by further processing of the signal to complete the active sensing process. The biggest advantage of active sensing is that the signal is controllable to facilitate accomplishing different sensing purposes, and power consumed by the sensor can be reduced to a certain extent, and a target is measured or tracked with relatively high efficiency and accuracy. However, the signal received by the receiver may be distorted due to the various influences of external environments (e.g., the influence of the external environment on the signal when the signal source is visible light) and errors in the system itself during signal transmission. For example, when the receiver is a charge coupled device (CCD) image sensor, the received signal is distorted due to distortion of a lens, which leads to an error or fault in the sensing process. This also hinders the further development of the traditional active sensing methods.

SUMMARY

One of the objectives of the embodiments of the present disclosure is to provide a signal source space sensing method and apparatus and an active sensing system, so as to solve the above-mentioned problems.

In a first aspect, an embodiment of the present disclosure provides a signal source space sensing method, which is applied to an active sensing system comprising an object to be measured, at least one signal transmitter, a controller, and at least one signal receiver, wherein both the signal transmitter and the signal receiver are electrically connected to the controller, and both the signal transmitter and the signal receiver correspond to the object to be measured, wherein the method comprises:

controlling, by the controller, the signal transmitter to transmit a first signal to the object to be measured;

controlling, by the controller, the signal receiver to receive a second signal, wherein the second signal is obtained after the first signal is transmitted through the object to be measured;

determining, by the controller, a coordinate relationship between a spatial position of the object to be measured and a signal source space on the basis of the first signal and the second signal, wherein the signal source space is a coordinate space where the first signal emitted from the signal transmitter is located; and mapping, by the controller, the second signal back to the signal source space, on the basis of the coordinate relationship between the spatial position of the object to be measured and the signal source space, so as to obtain a signal source space signal to reconstruct a sensing signal.

Optionally, there are a plurality of signal receivers, and each of the signal receivers is electrically connected to the controller;

the mapping the second signal back to the signal source space to obtain a signal source space signal includes:

mapping the second signal received by each of the signal receivers back to the signal source space, so as to fuse the plurality of second signals in the signal source space to obtain a signal source space signal; and reconstructing a sensing signal on the basis of the signal source space signal.

Optionally, there are a plurality of signal transmitters, each of the signal transmitters is electrically connected to the controller, and there are a plurality of signal source spaces;

the mapping the second signal back to the signal source space to obtain a signal source space signal so as to reconstruct a sensing signal includes:

mapping each of the second signals received by the signal receiver back to a signal source space corresponding to each of the second signals, so that one of signal source space signals is reconstructed for one of the signal source spaces; and fusing the plurality of signal source space signals and then reconstructing a sensing signal.

Optionally, when the active sensing system is a structured light three-dimensional reconstruction system, the signal transmitter is a projector, and the signal receiver is a camera, the controlling, by the controller, the signal transmitter to emit a first signal to the object to be measured includes:

controlling, by the controller, the projector to project coded patterns in horizontal direction and vertical direction onto the object to be measured.

Optionally, the coded pattern in the horizontal direction consists of vertical light and dark stripes; and the coded pattern in the vertical direction consists of horizontal light and dark stripes.

Optionally, the controlling, by the controller, the signal receiver to receive a second signal includes:

controlling, by the controller, the camera to capture deformed patterns in horizontal direction and vertical direction from the object to be measured.

Optionally, the controlling, by the controller, the signal receiver to receive a second signal includes:

controlling, by the controller, the camera to capture a photo of the object to be measured having deformed patterns.

Optionally, the determining, by the controller, a coordinate relationship between the spatial position of the object to be measured and a signal source space on the basis of the first signal and the second signal includes:

calculating projection coordinates of each pixel of the light and dark stripes in the deformed patterns, and mapping the projection coordinates of each pixel back to the signal source space to obtain camera coordinates of each pixel in the signal source space.

Optionally, the determining, by the controller, a coordinate relationship between the spatial position of the object to be measured and a signal source space on the basis of the first signal and the second signal includes:

calculating, by the controller, on the basis of the deformed patterns in horizontal direction and vertical direction captured by the camera, the projection coordinates of each pixel in the deformed patterns.

Optionally, the calculating, by the controller, on the basis of the deformed patterns in horizontal direction and vertical direction captured by the camera, the projection coordinates of each pixel in the deformed patterns includes:

calculating the projection coordinates $(\phi^{x^c}, \phi^{y^c})$ of each pixel in the deformed patterns by the following formulae according to the deformed pattern $I_n^{x^c}(x^c, y^c)$ in the horizontal direction and the deformed pattern $I_n^{y^c}(x^c, y^c)$ in the vertical direction, $$\phi^{x^c} = \left| \pi + \arctan\left( \frac{\sum_{n=0}^{N-1} I_n^{x^c} \sin\left(\frac{2\pi n}{N}\right)}{\sum_{n=0}^{N-1} I_n^{x^c} \cos\left(\frac{2\pi n}{N}\right)} \right) \right| \frac{W^p}{2\pi},$$

$$\phi^{y^c} = \left| \pi + \arctan\left( \frac{\sum_{n=0}^{N-1} I_n^{y^c} \sin\left(\frac{2\pi n}{N}\right)}{\sum_{n=0}^{N-1} I_n^{y^c} \cos\left(\frac{2\pi n}{N}\right)} \right) \right| \frac{H^p}{2\pi},$$

where $W^p$ is a width of the coded pattern in the horizontal direction projected by the projector, $H^p$ is a height of the coded pattern in the vertical direction projected by the projector, and $$\frac{2\pi n}{N}$$

is a change in phase shift of the coded pattern in the horizontal or vertical direction projected by the projector.

Optionally, the mapping the second signal back to the signal source space to obtain a signal source space signal so as to reconstruct a sensing signal includes:

mapping the projection coordinates of each pixel back to the signal source space for rounding the projection coordinates, and obtaining the camera coordinates of each pixel in the signal source space by using a reverse interpolation method, so as to achieve imaging in the signal source space.

Optionally, the signal receiver is a planar array type signal receiver.

Optionally, the mapping the second signal back to the signal source space to obtain a signal source space signal so as to reconstruct a sensing signal includes:

mapping the second signal back to the signal source space to obtain three-dimensional point cloud data in the signal source space.

In a second aspect, an embodiment of the present disclosure further provides a signal source space sensing apparatus, which is applied to an active sensing system comprising an object to be measured, a signal transmitter, a controller, and a signal receiver, wherein both the signal transmitter and the signal receiver are electrically connected to the controller, and both the signal transmitter and the signal receiver correspond to the object to be measured, wherein the apparatus comprises a first control module, a second control module, a coordinate determination module, and an execution module. Here, the first control module is configured to control the signal transmitter to emit a first signal to the object to be measured. The second control module is configured to control the signal receiver to receive a second signal, wherein the second signal is obtained after the first signal is transmitted through the object to be measured. The coordinate determination module is configured to determine a coordinate relationship between a spatial position of the object to be measured and a signal source space on the basis of the first signal and the second signal, wherein the signal source space is a coordinate space where the first signal emitted from the signal transmitter is located. The execution module is configured to map the second signal back to the signal source space, on the basis of the coordinate relationship between the spatial position of the object to be measured and the signal source space, so as to obtain a signal source space signal to reconstruct a sensing signal.

In a third aspect, an embodiment of the present disclosure further provides an active sensing system, comprising an object to be measured, a signal transmitter, a controller, and a signal receiver, wherein both the signal transmitter and the signal receiver are electrically connected to the controller, and both the signal transmitter and the signal receiver correspond to the object to be measured. The controller comprises: a memory; a processor; and a signal source space sensing apparatus stored in the memory and comprising one or more software functional modules executed by the processor. The signal source space sensing apparatus comprises a first control module, a second control module, a coordinate determination module, and an execution module. Here, the first control module is configured to control the signal transmitter to emit a first signal to the object to be measured. The second control module is configured to control the signal receiver to receive a second signal, wherein the second signal is obtained after the first signal is transmitted through the object to be measured. The coordinate determination module is configured to determine a coordinate relationship between a spatial position of the object to be measured and a signal source space on the basis of the first signal and the second signal, wherein the signal source space is a coordinate space where the first signal emitted from the signal transmitter is located. The execution module is configured to map the second signal back to the signal source space, on the basis of the coordinate relationship between the spatial position of the object to be measured and the signal source space, so as to obtain a signal source space signal to reconstruct a sensing signal.

The embodiments of the present disclosure provide a signal source space sensing method and apparatus and an active sensing system, compared with the prior art. Firstly, a first signal is emitted by a signal transmitter to an object to be measured, and the first signal is transmitted through the object to be measured to obtain a second signal which is received by a signal receiver. Then, a controller determines a coordinate relationship between the spatial position of the object to be measured and a signal source space on the basis of the first signal and the second signal, and maps the second signal back to the signal source space on the basis of the coordinate relationship to obtain a signal source space signal so as to reconstruct a sensing signal. Thus, the distortion of the signal that may occur during information transmission can be avoided, thereby achieving more effective active sensing or imaging, to break through the bottleneck of the traditional methods.

In order to enable clearer and easier understanding of the above objectives, features, and advantages of the present disclosure, some embodiments will be described in detail below by way of example with reference to the accompanying drawings.

BRIEF DESCRIPTION OF DRAWINGS

In order to more clearly illustrate the technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can be obtained from these drawings without any inventive effort.

Figure 1:
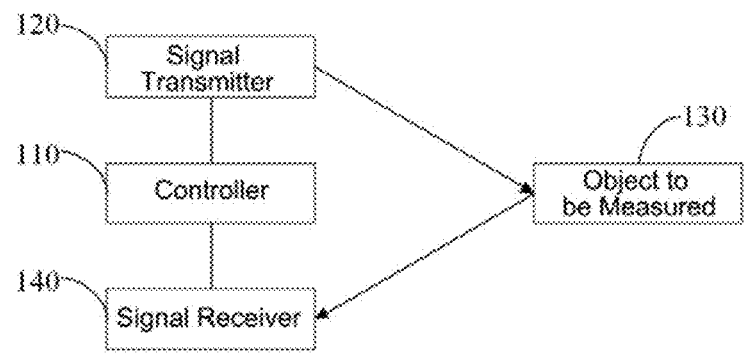
FIG. 1 shows a schematic block diagram of an active sensing system according to an embodiment of the present disclosure.

Reference Signs: 100—active sensing system; 110—controller; 120—signal transmitter; 130—object to be measured; 140—signal receiver; 111—memory; 112—storage controller; 113—processor; 200—signal source space sensing apparatus; 201—first control module; 202—second control module; 203—coordinate determination module; 204—execution module.

DETAILED DESCRIPTION OF EMBODIMENTS

The technical solutions of the embodiments of the present disclosure will be described below clearly and completely with reference to the drawings of the embodiments of the present disclosure. It is apparent that the embodiments to be described are merely some, but not all of the embodiments of the present disclosure. Generally, the components of the embodiments of the present disclosure, as described and illustrated in the drawings herein, may be arranged and designed in a wide variety of different configurations. Thus, the following detailed description of the embodiments of the present disclosure, as represented in the drawings, is not intended to limit the scope of the present disclosure as claimed, but is merely representative of selected embodiments of the present disclosure. All the other embodiments obtained by those skilled in the art in light of the embodiments of the present disclosure without inventive efforts will fall within the scope of the present disclosure as claimed.

It should be noted that similar reference signs and letters refer to similar items in the following drawings, and thus once a certain item is defined in one figure, it may not be further defined or explained in the following figures. Moreover, in the description of the present disclosure, terms such as "first" and "second" are used for distinguishing description only, and should not be understood as an indication or implication of relative importance.

Referring to FIG. 1, FIG. 1 shows a schematic block diagram of an active sensing system 100 according to an embodiment of the present disclosure. The active sensing system 100 comprises a controller 110, a signal transmitter 120, an object to be measured 130, and a signal receiver 140. Both the signal transmitter 120 and the signal receiver 140 are electrically connected to the controller 110, and both the signal transmitter 120 and the signal receiver 140 correspond to the object to be measured 130.

Figure 2:
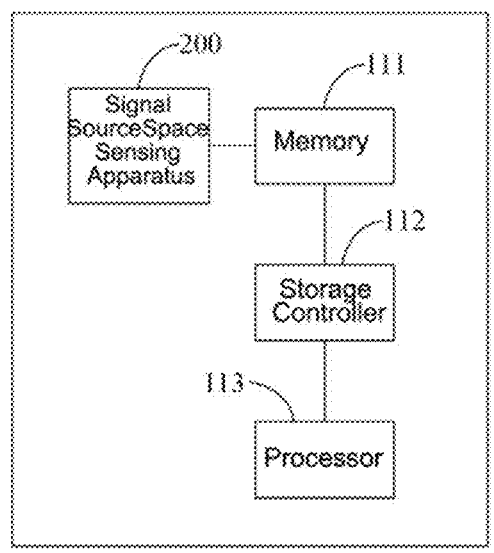
FIG. 2 shows a schematic block diagram of a controller according to an embodiment of the present disclosure.

Referring to FIG. 2, FIG. 2 shows a schematic block diagram of the controller 110 according to an embodiment of the present disclosure. The controller 110, which may be a desktop computer, a notebook computer, or the like, comprises a signal source space sensing apparatus 200, a memory 111, a storage controller 112, and a processor 113.

The elements, i.e., the signal source space sensing apparatus 200, the memory 111, the storage controller 112, and the processor 113, are electrically connected directly or indirectly to one another to achieve data transmission or interaction. For example, these elements may be electrically connected to one another via one or more communication buses or signal lines. The signal source space sensing apparatus 200 comprises at least one software functional module that can be stored in the memory 111 or fixed in an operating system (OS) of the controller 110 in the form of software or firmware. The processor 113 is configured to execute an executable module stored in the memory 111, for example, a software functional module or a computer program included in the signal source space sensing apparatus 200.

Here, the memory 111 may be, but is not limited to, a random access memory (RAM), a read only memory (ROM), a programmable read-only memory (PROM), an erasable programmable read-only memory (EPROM), an electric erasable programmable read-only memory (EEPROM), or the like.

The processor 113 may be an integrated circuit chip with signal processing capability. The above-mentioned processor 113 may be a general-purpose processor, including a central processing unit (CPU), a network processor (NP), a voice processor, a video processor, and the like, or may be a digital signal processor, an application-specific integrated circuit, a field programmable gate array or any other programmable logic device, a discrete gate or a transistor logic device, or a discrete hardware component. The methods, steps, and logical block diagrams disclosed in the embodiments of the present disclosure can be implemented or executed thereby. The general-purpose processor may be a microprocessor, or the processor 113 may be any conventional processor or the like.

Figure 3:
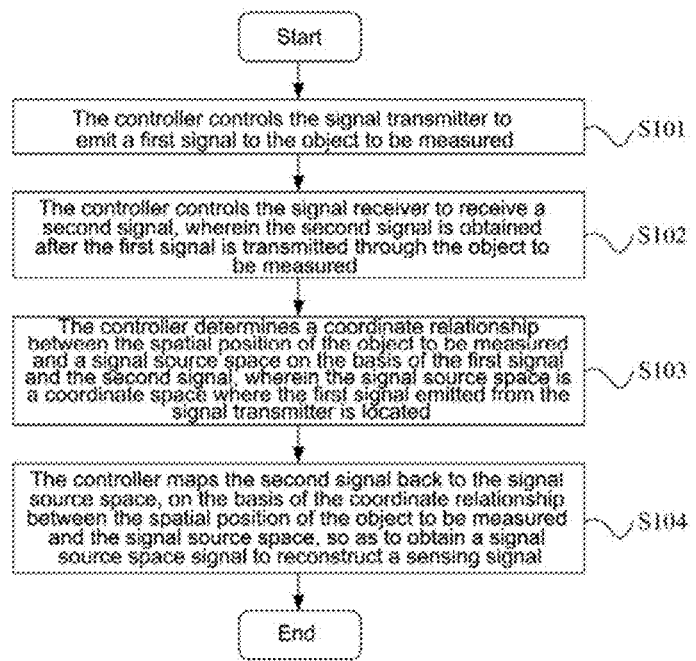
FIG. 3 shows a flowchart of a signal source space sensing method according to an embodiment of the present disclosure.

Referring to FIG. 3, FIG. 3 shows a flowchart of a signal source space sensing method according to an embodiment of the present disclosure. The signal source space sensing method comprises the following steps S101 to S104.

In step S101, the controller controls the signal transmitter to emit a first signal to the object to be measured.

In an embodiment of the present disclosure, the first signal includes electromagnetic waves, acoustic waves, ultrasonic waves, and others in all wavelength bands including visible light, and the signal transmitter 120 may be of a planar array type, a dot type, a linear array type, or the like.

When the active sensing system 100 is a structured light three-dimensional reconstruction system, the signal transmitter 120 is a projector, and the signal receiver 140 is a camera, the controller 110 may control the projector to project coded patterns $I_n^{x^p}(x^p,y^p)$ and $I_n^{y^p}(x^p,y^p)$ in horizontal direction and vertical direction onto the object to be measured 130. For example, in this embodiment, the coded pattern in the horizontal direction consists of vertical light and dark stripes, and the coded pattern in the vertical direction consists of horizontal light and dark stripes.

In step S102, the controller controls the signal receiver to receive a second signal, wherein the second signal is obtained after the first signal is transmitted through the object to be measured.

In an embodiment of the present disclosure, the signal receiver 140 may be a planar array type signal receiver, and the second signal may be a signal in a planar array form or in a form equivalent to the planar array form.

For example, when the active sensing system 100 is a structured light three-dimensional reconstruction system, the signal transmitter 120 is a projector, and the signal receiver 140 is a camera, deformed patterns $I_n^{x^c}(x^c,y^c)$ and $I_n^{y^c}(x^c,y^c)$ in horizontal direction and vertical direction are formed on the object to be measured after the coded patterns $I_n^{x^p}(x^p,y^p)$ and $I_n^{y^p}(x^p,y^p)$ in horizontal direction and vertical direction are projected onto the object to be measured 130 in the step 101. The second signal may be a picture of the object to be measured 130 with the deformed patterns in horizontal direction and vertical direction that is taken by the camera. For example, the controller 110 may control the camera to capture the deformed patterns $I_n^{x^c}(x^c,y^c)$ and $I_n^{y^c}(x^c,y^c)$ in horizontal direction and vertical direction from the object to be measured 130.

In step S103, the controller determines a coordinate relationship between the spatial position of the object to be measured and a signal source space on the basis of the first signal and the second signal, wherein the signal source space is a coordinate space where the first signal emitted from the signal transmitter is located.

In an embodiment of the present disclosure, when the active sensing system 100 is a structured light three-dimensional reconstruction system, the signal transmitter 120 is a projector, and the signal receiver 140 is a camera, the controller 110 calculates, on the basis of the deformed patterns $I_n^{x^c}(x^c,y^c)$ and $I_n^{y^c}(x^c,y^c)$ in horizontal direction and vertical direction captured by the camera, the projection coordinates $(\phi^{x^c},\phi^{y^c})$ of each pixel in the deformed patterns. When taking the phase detection profilometry as an example, $\phi^{x^c}$ may be calculated by the formula $$\phi^{x^c} = \left(\pi + \arctan\left(\frac{\sum_{n=0}^{N-1} I_n^{x^c} \sin\left(\frac{2\pi n}{N}\right)}{\sum_{n=0}^{N-1} I_n^{x^c} \cos\left(\frac{2\pi n}{N}\right)}\right)\right)\frac{W^p}{2\pi},$$

where $I_n^{x^c}(x^c,y^c)$ represents the deformed pattern in the horizontal direction captured by the camera, $W^p$ is the width of the coded pattern in the horizontal direction projected by the projector, and $$\frac{2\pi n}{N}$$

is a change in phase shift of the coded pattern in the horizontal or vertical direction projected by the projector. Similarly, $\phi^{y^c}$ may be calculated by $$\phi^{y^c} = \left(\pi + \arctan\left(\frac{\sum_{n=0}^{N-1} I_n^{y^c} \sin\left(\frac{2\pi n}{N}\right)}{\sum_{n=0}^{N-1} I_n^{y^c} \cos\left(\frac{2\pi n}{N}\right)}\right)\right)\frac{H^p}{2\pi},$$

where $H^p$ is the height of the coded pattern in the vertical direction projected by the projector, and the projection coordinates $(\phi^{x^c},\phi^{y^c})$ are phase values calculated in the camera space.

In step S104, the controller maps the second signal back to the signal source space, on the basis of the coordinate relationship between the spatial position of the object to be measured and the signal source space, so as to obtain a signal source space signal so as to reconstruct a sensing signal.

For example, the position of each of pixels in the picture taken by the camera may be mapped back to the signal source space from the visual angle (perspective) of the projector according to the coordinate relationship between the spatial position of the object to be measured and the signal source space that is determined in the step S130, thereby reconstructing an image observed from the visual angle of the projector.

In this embodiment, the second signal may be mapped back to the signal source space to obtain three-dimensional point cloud data in the signal source space.

In an embodiment of the present disclosure, the active sensing system 100 may be a single sensor array comprising one signal transmitter 120 and one or more signal receivers 140, or a multiple sensor array comprising a plurality of signal transmitters 120 and a plurality of signal receivers 140.

When the active sensing system 100 is a single sensor array which comprises one signal transmitter 120 and one signal receiver 140, the controller 110 maps the second signal back to the signal source space, on the basis of the coordinate relationship between the spatial position of the object to be measured 130 and the signal source space, so as to obtain a signal source space signal so as to reconstruct a sensing signal.

When the active sensing system 100 is a single sensor array which comprises one signal transmitter 120 and a plurality of signal receivers 140, each of the signal receivers 140 is electrically connected to the controller 110. The controller 110 maps the second signal received by each of the signal receivers 140 back to the signal source space, on the basis of the coordinate relationship between the spatial position of the object to be measured 130 and the signal source space, so as to fuse the plurality of second signals in the signal source space to obtain a signal source space signal, and reconstruct a sensing signal on the basis of the signal source space signal.

When the active sensing system 100 is a multiple sensor array, in other words, when there are a plurality of signal transmitters 120, each of the signal transmitters 120 is electrically connected to the controller 110, and there are a plurality of signal source spaces. The controller 110 maps each of the second signals received by the signal receivers 140 back to a signal source space corresponding to each of the second signals, on the basis of the coordinate relationship between the spatial position of the object to be measured 130 and the signal source space, so that one of signal source space signals is reconstructed for one of the signal source spaces, and the plurality of signal source space signals are fused and then a sensing signal is reconstructed.

When the active sensing system 100 is a structured light three-dimensional reconstruction system, the signal transmitter 120 is a projector, and the signal receiver 140 is a camera, the signal source space is a projector space. The controller 110 maps the projection coordinates of each pixel back to the projector space, on the basis of the coordinate relationship between the spatial position of the object to be measured 130 and the projector space, so as to round the projection coordinates, and the camera coordinates of each pixel in the projector space are obtained by using a reverse interpolation method to achieve imaging in the signal source space.

Figure 4:
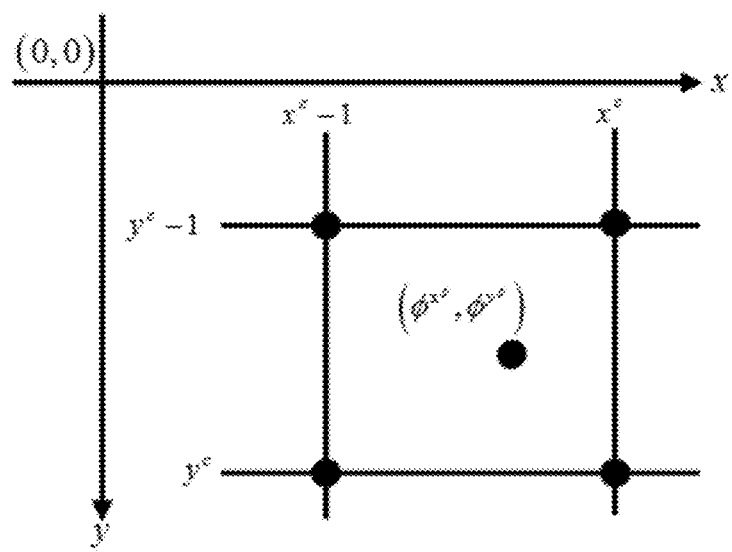
FIG. 4 shows projector coordinates and camera coordinates according to an embodiment of the present disclosure.
Figure 4:
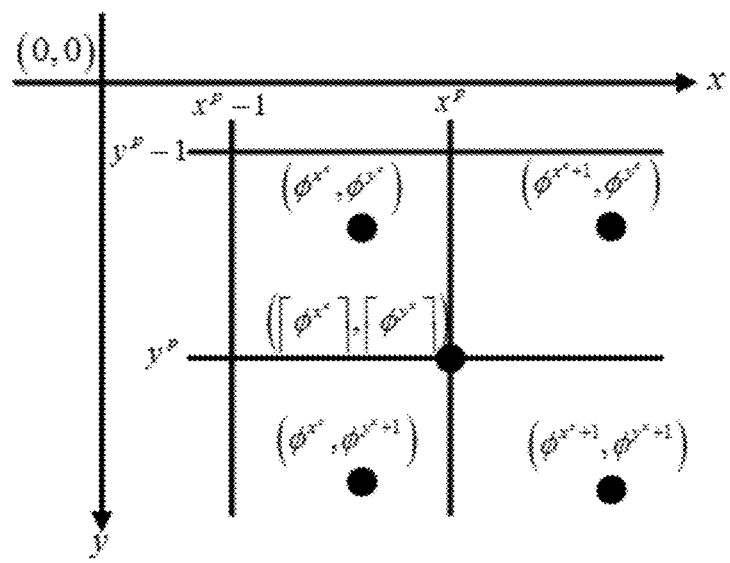
Figure 5:
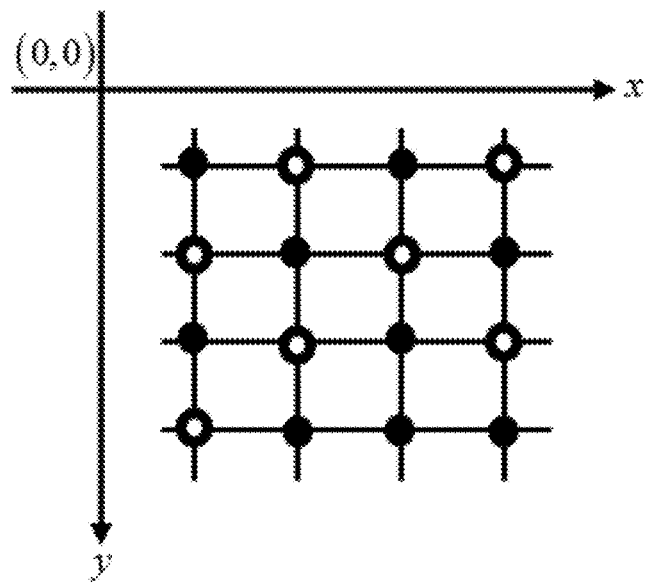
FIG. 5 shows a schematic diagram showing interpolation in a projector space and the geometric relationship in a structured light three-dimensional reconstruction system.
Figure 5:
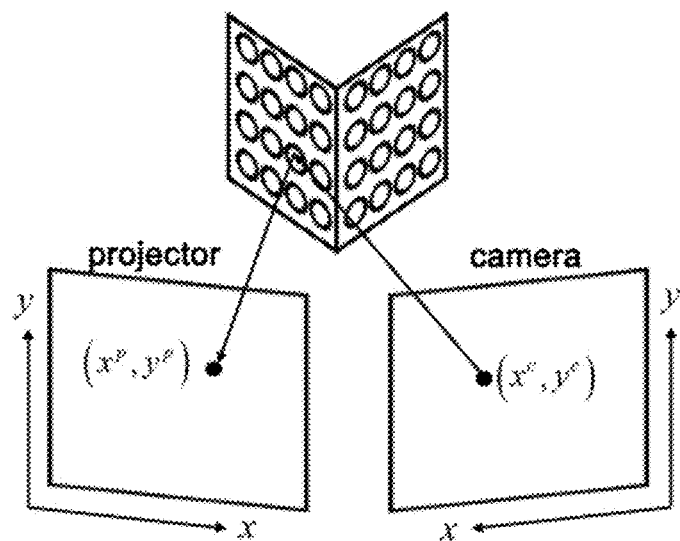

Since the projection coordinates $(\phi^{x^c}, \phi^{y^c})$ calculated in the step S103 are the phase values calculated in the camera space, which are floating-point numbers, the projection coordinates $(\phi^{x^c}, \phi^{y^c})$ with floating-point accuracy are first interpolated into the integer coordinate space of the projector space by using the reverse interpolation method, so as to obtain the camera coordinates $(\phi^{x^p}, \phi^{y^p})$ of each pixel. As shown in FIG. 4, the interpolation coefficient is calculated by using the projection coordinates $(\phi^{x^c+1}, \phi^{y^c})$, $(\phi^{x^c}, \phi^{y^c+1})$, and $(\phi^{x^c+1}, \phi^{y^c+1})$ corresponding to the known pixel coordinates $(x^c+1,y^c)$, $(x^c,y^c+1)$, and $(x^c+1,y^c+1)$ in the camera space, thereby calculating the camera coordinates $(\phi^{x^p}, \phi^{y^p})$. In addition, blank points in the projector space are interpolated by using the surrounding points existing in the projector space. As shown in FIG. 5(a), the black solid points are the existing points, and these points are used for interpolation of the black hollow points, so that the camera coordinates of each of the points in the projector space are obtained. Namely, the imaging in the signal source space is completed. Then, a projector parameter matrix and a camera parameter matrix calibrated in advance are combined to reconstruct a three-dimensional point cloud.

When the active sensing system 100 is a structured light three-dimensional reconstruction system, the signal source space sensing method described above is applicable to different structured light technologies, such as phase measurement profilometry, Fourier profilometry, linear structured light technology, etc. Similarly, the signal source space sensing method is applicable also to other active sensing processes in a planar array form or in a form equivalent to the planar array form.

In the traditional structured light three-dimensional imaging, the correspondence relationship between the projector coordinates and the camera coordinates of each point is calculated according to a deformed patterns captured by the camera, and then is combined with calibration information to reconstruct a three-dimensional point cloud. In other words, the reconstruction is performed from the visual angle of the camera in the traditional structured light three-dimensional imaging. However, a large error or even fault may occur in the reconstruction of the three-dimensional point cloud due to lens distortion or the nonlinear characteristics of the projector. The signal source space sensing method according to an embodiment of the present disclosure, when applied to structured light three-dimensional imaging, includes the following advantages, compared with the traditional structured light three-dimensional imaging.

Figure 6:
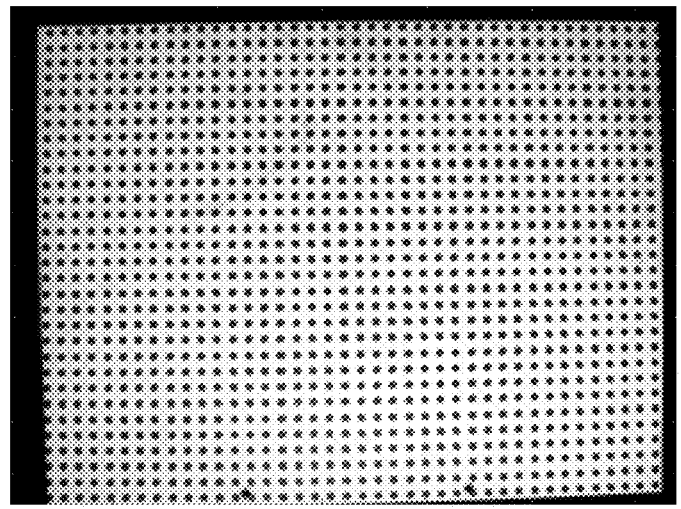
FIG. 6 shows an image obtained by traditional active sensing and an image obtained by signal source space sensing according to an embodiment of the present disclosure.
Figure 6:
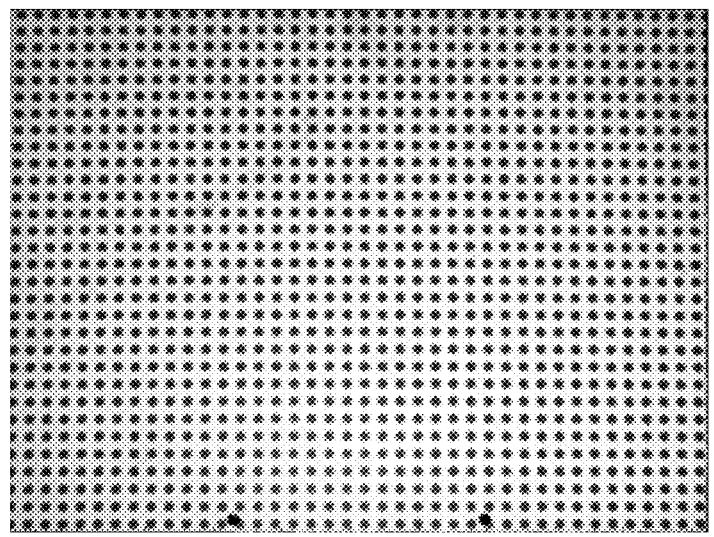

Firstly, a high-resolution two-dimensional image with high quality is reconstructed in a projector space. A high-resolution two-dimensional image can be obtained by mapping an image captured by a low-resolution camera to a high-resolution projector space. For example, a Casio XJ-M140 projector with a resolution of 1024×768 is used as the signal transmitter 120, and an AVT Prosilica GC650 camera having a resolution of 640×480 and operating in a grayscale mode is used as the signal receiver 140. Referring to FIG. 6, FIG. 6(a) shows an image captured by the camera, with a resolution of 640×480, where a target region occupies only a part of the entire image; and FIG. 6(b) shows a two-dimensional image reconstructed in the projector space, with a resolution of 1024×768, where a target region occupies the entire projector space. Therefore, a high-resolution image can be obtained by mapping an image in the camera space to the projector space. On the other hand, the image in the camera space will be affected by the distortion of a lens. As shown in FIG. 6(b), it can be known, from the basic principle of structured light three-dimensional imaging, that there is no effect caused by lens distortion in the reconstruction of the two-dimensional image in the projector space, whereby the effect caused by the lens distortion can be easily eliminated. Hence, a high-resolution two-dimensional image with high quality can be obtained in the projector space by using the signal source space sensing method according to an embodiment of the present disclosure.

Figure 7:
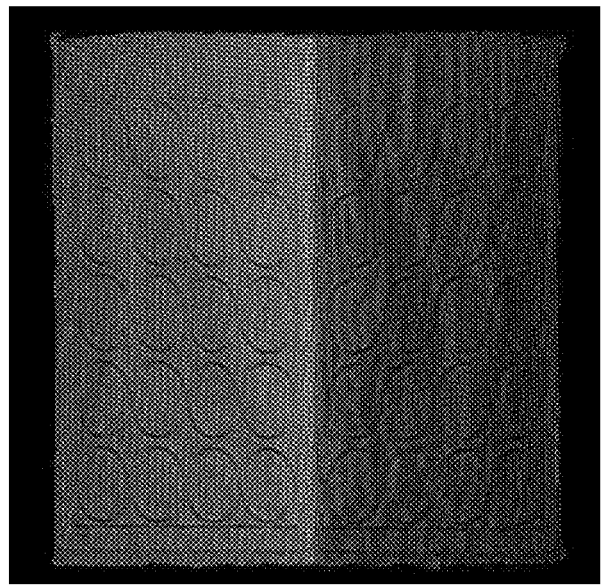
FIG. 7 shows a three-dimensional point cloud reconstructed by traditional active sensing.
Figure 7:
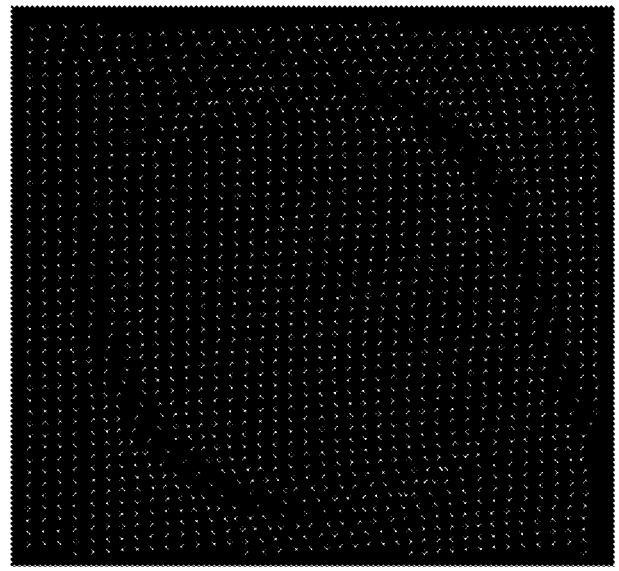
Figure 8:
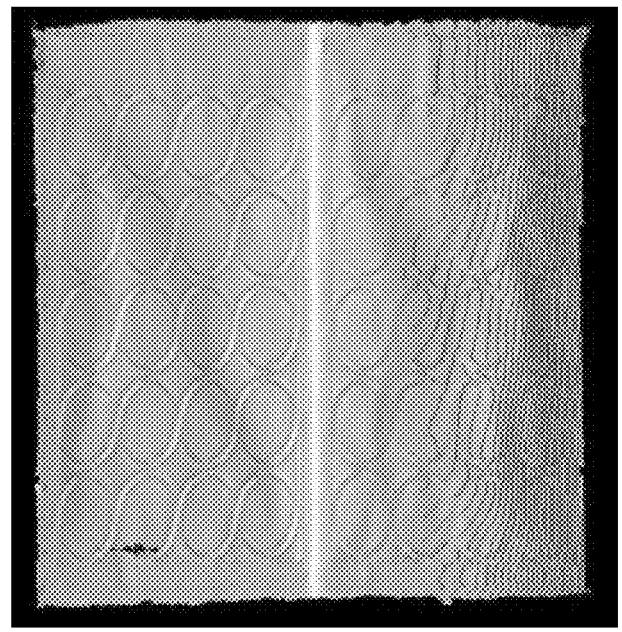
FIG. 8 shows a three-dimensional point cloud reconstructed by signal source space sensing according to an embodiment of the present disclosure.
Figure 8:
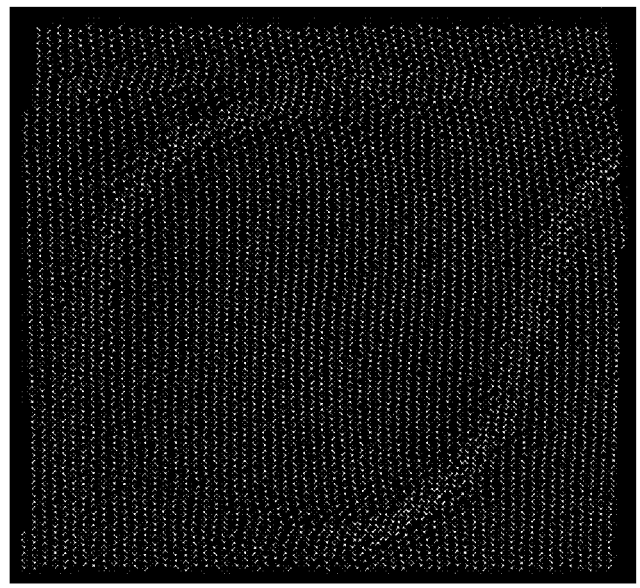

Secondly, for high-resolution structured light three-dimensional imaging in the projector space, a high-resolution two-dimensional image with high quality is obtained in the projector space by using the signal source space sensing method, and a high-resolution three-dimensional point cloud can be reconstructed based on the high-resolution two-dimensional image. For example, as shown in FIGS. 7 and 8, FIG. 7(a) is a front view of a three-dimensional point cloud reconstructed by traditional active sensing, FIG. 7(b) is a partial enlarged view of FIG. 7(a), FIG. 8(a) is a front view of a three-dimensional point cloud reconstructed by signal source space sensing according to an embodiment of the present disclosure, and FIG. 8(b) is a partial enlarged view of FIG. 8(a). It can be clearly observed from FIGS. 7 and 8 that a more uniform and dense three-dimensional point cloud can be reconstructed by the signal source space sensing method according to an embodiment of the present disclosure.

Figure 9:
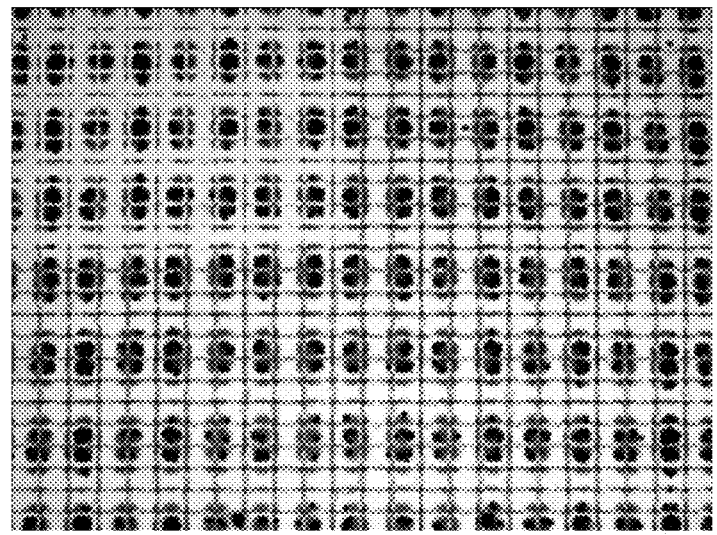
FIG. 9 shows the distributions of error points caused by nonlinearity in the traditional active sensing and in the signal source space sensing according to an embodiment of the present disclosure.
Figure 9:
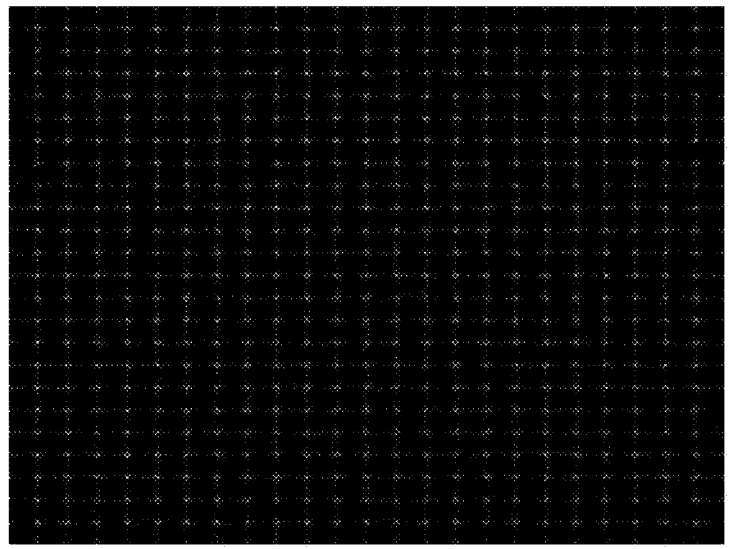

Thirdly, the problem for traditional structured light is redefined. As shown in FIGS. 9(a) and 9(b), the nonlinear distortion of the projector in the structured light system will cause a deviation in the pattern acquired by the camera, resulting in an error in imaging in the signal source space. In contrast, the sampling points obtained in an embodiment of the present disclosure are evenly distributed in the projector space, which is very advantageous to the study of nonlinear problems and is simpler than traditional nonlinear error modeling. In addition, regarding the aspect of calibration of the camera in the structured light system, a high-resolution two-dimensional image with high quality is reconstructed in the projector space according to the method proposed in an embodiment of the present disclosure, thus the calibration process will not be affected by the distortion of the camera, and a calibrated matrix with higher accuracy can be obtained, so as to further improve the measurement accuracy.

Fourthly, two-dimensional imaging is achieved with one-dimensional signals. In the traditional linear structured light technology, the object to be measured 130 is scanned stepwise with single linear light in one direction, and only one-dimensional information on light stripes can be obtained from an image captured by the camera. In contrast, light stripes in two directions in the camera space can be mapped to the projector space by using the signal source space sensing method according to an embodiment of the present disclosure, so that the signal source is extended to a two-dimensional level to obtain a two-dimensional image. Therefore, the signal source space sensing method according to an embodiment of the present disclosure is applicable not only to sensing in a planar array form, but also to sensing in a form equivalent to the planar array form. The signal receiver 140 may map two pieces of one-dimensional information to the signal source space, respectively, so that an equivalent two-dimensional planar array is formed to complete imaging in the signal source space.

Fifthly, point clouds from multiple projectors and multiple cameras are rapidly spliced. A structured light system with a single projector and a single camera has the problem of blind spots in measurement. Namely, the information on the object to be measured 130 cannot be obtained in a non-common area between the projector and the camera. However, in the case of a structured light system with multiple cameras, the traditional three-dimensional reconstruction from the visual angles of the cameras requires an alignment of three-dimensional point clouds in two or more spaces, and thus is restricted by the accuracy and computational amount in the alignment of point clouds. Three-dimensional reconstruction using the signal source space sensing method according to an embodiment of the present disclosure allows the visual angles of the multiple cameras to be integrated into the same projector space, so that the splicing function can be accomplished directly with high accuracy at fast speed.

Figure 10:
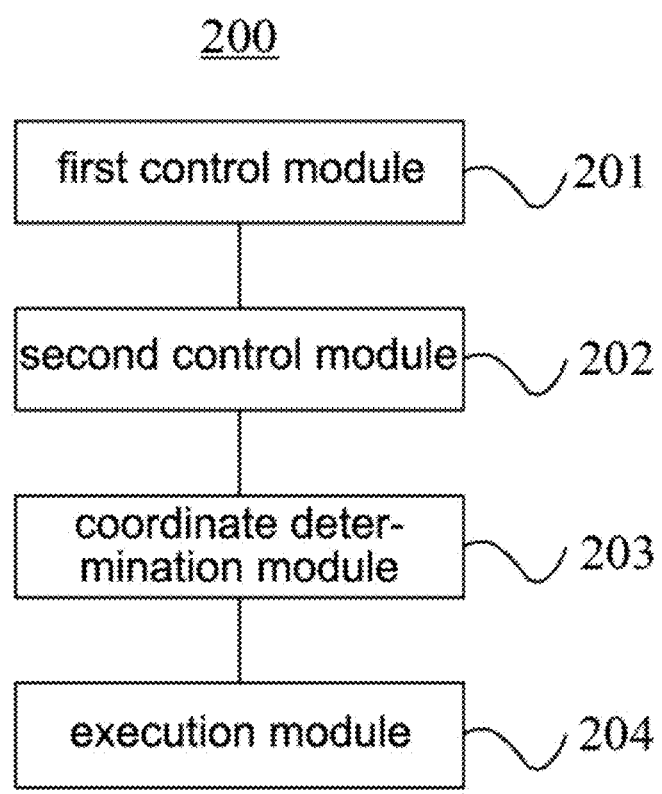
FIG. 10 shows a schematic block diagram of a signal source space sensing apparatus according to an embodiment of the present disclosure.

Referring to FIG. 10, FIG. 10 shows a schematic block diagram of a signal source space sensing apparatus 200 according to an embodiment of the present disclosure. The signal source space sensing apparatus 200 comprises a first control module 201, a second control module 202, a coordinate determination module 203, and an execution module 204.

The first control module 201 is configured in a controller to control a signal transmitter to emit a first signal to the object to be measured.

The second control module 202 is configured in the controller to control a signal receiver to receive a second signal, wherein the second signal is obtained after the first signal is transmitted through the object to be measured.

The coordinate determination module 203 is configured in the controller to determine a coordinate relationship between the spatial position of the object to be measured and a signal source space on the basis of the first signal and the second signal, wherein the signal source space is a coordinate space where the first signal emitted from the signal transmitter is located.

The execution module 204 is configured in the controller to map the second signal back to the signal source space, on the basis of the coordinate relationship between the spatial position of the object to be measured and the signal source space, so as to obtain a signal source space signal so as to reconstruct a sensing signal.

In summary, the embodiments of the present disclosure provide a signal source space sensing method and apparatus and an active sensing system. The active sensing system comprises an object to be measured, a signal transmitter, a controller, and a signal receiver. Both the signal transmitter and the signal receiver are electrically connected to the controller, and both the signal transmitter and the signal receiver correspond to the object to be measured. The method comprises: controlling, by the controller, the signal transmitter to emit a first signal to the object to be measured; controlling, by the controller, the signal receiver to receive a second signal, wherein the second signal is obtained after the first signal is transmitted through the object to be measured; determining, by the controller, a coordinate relationship between the spatial position of the object to be measured and a signal source space on the basis of the first signal and the second signal, wherein the signal source space is a coordinate space where the first signal emitted from the signal transmitter is located; and mapping, by the controller, the second signal back to the signal source space, on the basis of the coordinate relationship between the spatial position of the object to be measured and the signal source space, so as to obtain a signal source space signal so as to reconstruct a sensing signal. Thus, the distortion of the signal that may occur during information transmission can be avoided, thereby achieving more effective active sensing or imaging, to break through the bottleneck of the traditional methods.

It will be understood that the apparatus and method disclosed in the several embodiments according to the present disclosure may also be implemented in other ways. The embodiments of the apparatus described above are merely illustrative in nature. For example, the flow charts and block diagrams in the drawings illustrate implementable architectures, functionalities, and operations of apparatuses, methods, and computer program products according to multiple embodiments of the present disclosure. In this regard, each block in the flow charts or block diagrams may represent a module, a program segment, or a portion of code, wherein the module, the program segment, or the portion of code includes one or more executable instructions for implementing specified logical function(s). It should also be noted that in some alternative implementations, the functions shown in the blocks may occur out of the order noted in the drawings. For example, two blocks shown in succession may in fact be executed substantially concurrently, or they may sometimes be executed in a reverse order, depending upon the functionality involved. It will also be noted that each block of the block diagrams and/or flow charts, and combinations of blocks in the block diagrams and/or flow charts, may be implemented by special-purpose hardware-based systems that execute the specified functions or actions, or by a combination of special-purpose hardware and computer instructions.

In addition, the individual functional modules in the embodiments of the present disclosure may be integrated together to form an independent part, or each of the modules may be physically stand-alone, or two or more of the modules may be integrated into an independent part.

When implemented in the form of a software functional module and sold or used as an independent product, the functions may be stored in a computer-readable storage medium. Based on such understanding, the technical solutions of the present disclosure essentially, or the part thereof contributing to the prior art, or a part of the technical solutions may be embodied in the form of a software product. The computer software product is stored in a storage medium and includes a number of instructions for causing a computer device (which may be a personal computer, a server, a network device, or the like) to execute all or some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk. It should be noted that in this text, relationship terms such as first, second, and the like are used only for distinguishing one entity or operation from another entity or operation, while it is not necessarily required or implied that these entities or operations have any such practical relationship or order. Furthermore, the terms "comprise", "include", or any variations thereof are intended to cover non-exclusive inclusions, such that a process, method, article, or device that comprises a list of elements not only comprises those elements, but also comprises other elements not expressly listed, or also comprises elements inherent to such process, method, article, or device. Without more restrictions, an element defined with the wording "comprising a . . . " does not exclude the presence of additional identical elements in the process, method, article, or device comprising said element.

The above description is merely illustrative of one embodiment of the present disclosure and is not intended to limit the present disclosure. It will be understood by those skilled in the art that various modifications and variations can be made to the present disclosure. Any modifications, equivalent alternatives, improvements, and so on made within the spirit and principle of the present disclosure are to be included in the scope of protection of the present disclosure. It should be noted that similar reference signs and letters refer to similar items in the following drawings. Thus, once a certain item is defined in one figure, it may not be further defined or explained in the following figures.

INDUSTRIAL APPLICABILITY

The embodiments of the present disclosure provide a signal source space sensing method and apparatus and an active sensing system. Firstly, a first signal is emitted by a signal transmitter to an object to be measured, and the first signal is transmitted through the object to be measured to obtain a second signal, which is received by a signal receiver. Then, a controller determines a coordinate relationship between the spatial position of the object to be measured and a signal source space on the basis of the first signal and the second signal, and maps the second signal back to the signal source space on the basis of the coordinate relationship to obtain a signal source space signal so as to reconstruct a sensing signal. Thus, the distortion of the signal that may occur during information transmission can be avoided, thereby achieving more effective active sensing or imaging, to break through the bottleneck of the traditional methods.

What is claimed is:

1. A signal source space sensing method, wherein the signal source space sensing method is applicable to an active sensing system comprising an object to be measured, at least one signal transmitter, a controller, and at least one signal receiver, wherein both the at least one signal transmitter and the at least one signal receiver are electrically connected to the controller, and both the at least one signal transmitter and the at least one signal receiver correspond to the object to be measured, wherein the method comprises:

controlling, by the controller, the at least one signal transmitter to emit a first signal to the object to be measured;

controlling, by the controller, the at least one signal receiver to receive a second signal, wherein the second signal is obtained after the first signal is reflected by the object to be measured;

determining, by the controller, a coordinate relationship between a spatial position of the object to be measured and a signal source space based on the first signal and the second signal, wherein the signal source space is a coordinate space where the first signal emitted from the at least one signal transmitter is located; and mapping, by the controller, the second signal back to the signal source space, based on the coordinate relationship between the spatial position of the object to be measured and the signal source space, so as to obtain a signal source space signal to reconstruct a sensing signal.

2. The method according to claim 1, wherein a plurality of signal receivers are provided, and each of the signal receivers is electrically connected to the controller;

the mapping the second signal back to the signal source space to obtain a signal source space signal comprises:

mapping each second signals received by the plurality of signal receivers back to the signal source space, so as to fuse a plurality of second signals in the signal source space to obtain the signal source space signal; and reconstructing the sensing signal based on the signal source space signal.

3. The method according to claim 1, wherein a plurality of signal transmitters are provided, each of the signal transmitters is electrically connected to the controller, and a plurality of signal source spaces are provided;

the mapping the second signal back to the signal source space to obtain a signal source space signal so as to reconstruct a sensing signal comprises:

mapping each of second signals, received by the at least one signal receiver, back to a signal source space corresponding to each of the second signals, so that one of signal source space signals is reconstructed for one of the signal source spaces; and fusing a plurality of the signal source space signals and then reconstructing the sensing signal.

4. The method according to claim 1, wherein the at least one signal receiver is a planar array type signal receiver.

5. The method according to claim 1, wherein the mapping the second signal back to the signal source space to obtain a signal source space signal so as to reconstruct a sensing signal comprises:

mapping the second signal back to the signal source space to obtain three-dimensional point cloud data in the signal source space.

6. The method according to claim 1, wherein when the active sensing system is a structured light three-dimensional reconstruction system, the at least one signal transmitter is a projector, and the at least one signal receiver is a camera, and the controlling by the controller the at least one signal transmitter to emit a first signal to the object to be measured comprises:
   controlling, by the controller, the projector to project coded patterns in a horizontal direction and a vertical direction onto the object to be measured.

7. The method according to claim 6, wherein a coded pattern in the horizontal direction consists of vertical light and dark stripes; and a coded pattern in the vertical direction consists of horizontal light and dark stripes.

8. The method according to claim 6, wherein the controlling by the controller the at least one signal receiver to receive a second signal comprises:
   controlling, by the controller, the camera to capture a photo of the object to be measured having deformed patterns.

9. The method according to claim 8, wherein the determining by the controller a coordinate relationship between a spatial position of the object to be measured and a signal source space based on the first signal and the second signal comprises:
   calculating projection coordinates of each pixel of the light and dark stripes in the deformed patterns, and mapping the projection coordinates of each pixel back to the signal source space to obtain camera coordinates of each pixel in the signal source space.

10. The method according to claim 6, wherein the controlling by the controller the at least one signal receiver to receive a second signal comprises:
   controlling, by the controller, the camera to capture deformed patterns in the horizontal direction and the vertical direction from the object to be measured.

11. The method according to claim 10, wherein the determining by the controller a coordinate relationship between a spatial position of the object to be measured and a signal source space based on the first signal and the second signal comprises:
   calculating projection coordinates of each pixel of the light and dark stripes in the deformed patterns, and mapping the projection coordinates of each pixel back to the signal source space to obtain camera coordinates of each pixel in the signal source space.

12. The method according to claim 11, wherein the mapping the second signal back to the signal source space to obtain a signal source space signal so as to reconstruct a sensing signal comprises:
   mapping the projection coordinates of each pixel back to the signal source space for rounding the projection coordinates, and obtaining the camera coordinates of each pixel in the signal source space by using a reverse interpolation method, so as to achieve imaging in the signal source space.

13. The method according to claim 11, wherein the determining by the controller a coordinate relationship between a spatial position of the object to be measured and a signal source space based on the first signal and the second signal comprises:
   calculating, by the controller, based on the deformed patterns in the horizontal direction and the vertical direction captured by the camera, the projection coordinates of each pixel in the deformed patterns.

14. The method according to claim 13, wherein the calculating by the controller based on the deformed patterns in the horizontal direction and the vertical direction captured by the camera the projection coordinates of each pixel in the deformed patterns comprises:
calculating the projection coordinates ($\phi^{x^c}$, $\phi^{y^c}$) of each pixel in the deformed patterns by the following formulae according to a deformed pattern $I_n^{x^c}(x^c,y^c)$ in the horizontal direction and a deformed pattern $I_n^{y^c}(x^c,y^c)$ in the vertical direction, $$\phi^{x^c} = \left( \pi + \arctan\left( \frac{\sum_{n=0}^{N-1} I_n^{x^c} \sin\left(\frac{2\pi n}{N}\right)}{\sum_{n=0}^{N-1} I_n^{x^c} \cos\left(\frac{2\pi n}{N}\right)} \right) \right) \frac{W^p}{2\pi},$$

$$\phi^{y^c} = \left( \pi + \arctan\left( \frac{\sum_{n=0}^{N-1} I_n^{y^c} \sin\left(\frac{2\pi n}{N}\right)}{\sum_{n=0}^{N-1} I_n^{y^c} \cos\left(\frac{2\pi n}{N}\right)} \right) \right) \frac{H^p}{2\pi},$$

wherein $W^p$ is a width of a coded pattern in the horizontal direction projected by the projector, and $$\frac{2\pi n}{N}$$

is a change in phase shift of a coded pattern in the horizontal or vertical direction projected by the projector.

15. A signal source space sensing apparatus, wherein the signal source space sensing apparatus is applicable to an active sensing system comprising an object to be measured, at least one signal transmitter, a controller, and at least one signal receiver, wherein both the at least one signal transmitter and the at least one signal receiver are electrically connected to the controller, and both the at least one signal transmitter and the at least one signal receiver correspond to the object to be measured, wherein the apparatus comprises:
   a first control module, configured to control the at least one signal transmitter to emit a first signal to the object to be measured;
   a second control module, configured to control the at least one signal receiver to receive a second signal, wherein the second signal is obtained after the first signal is transmitted through the object to be measured;
   a coordinate determination module, configured to determine a coordinate relationship between a spatial position of the object to be measured and a signal source space based on the first signal and the second signal, wherein the signal source space is a coordinate space where the first signal emitted from the at least one signal transmitter is located; and
   an execution module, configured to map the second signal back to the signal source space, based on the coordinate relationship between the spatial position of the object to be measured and the signal source space, so as to obtain a signal source space signal to reconstruct a sensing signal.

16. An active sensing system, comprising an object to be measured, at least one signal transmitter, a controller, and at least one signal receiver, wherein both the at least one signal transmitter and the at least one signal receiver are electrically connected to the controller, and both the at least one signal transmitter and the at least one signal receiver correspond to the object to be measured, wherein the controller comprises: a memory; a processor; and a signal source space sensing apparatus, wherein the signal source space sensing apparatus is stored in the memory and comprises one or more software functional modules executed by the processor, wherein the signal source space sensing apparatus comprises:

a first control module, configured to control the at least one signal transmitter to emit a first signal to the object to be measured;

a second control module, configured to control the at least one signal receiver to receive a second signal, wherein the second signal is obtained after the first signal is transmitted through the object to be measured;

a coordinate determination module, configured to determine a coordinate relationship between a spatial position of the object to be measured and a signal source space based on the first signal and the second signal, wherein the signal source space is a coordinate space where the first signal emitted from the at least one signal transmitter is located; and an execution module, configured to map the second signal back to the signal source space, based on the coordinate relationship between the spatial position of the object to be measured and the signal source space, so as to obtain a signal source space signal to reconstruct a sensing signal.

* * * * *